US009771899B2

(12) United States Patent
Dudar et al.

(10) Patent No.: US 9,771,899 B2
(45) Date of Patent: Sep. 26, 2017

(54) METHODS AND SYSTEMS FOR DIAGNOSING FUEL TANK OIL-CANNING

(71) Applicant: Ford Global Technologies, LLC, Dearborn, WI (US)

(72) Inventors: Aed M. Dudar, Canton, MI (US); Dennis Seung-Man Yang, Canton, MI (US); Robert Ognjanovski, Jr., Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 249 days.

(21) Appl. No.: 14/672,809

(22) Filed: Mar. 30, 2015

(65) Prior Publication Data

US 2016/0290286 A1 Oct. 6, 2016

(51) Int. Cl.
*G01M 15/09* (2006.01)
*F02M 25/08* (2006.01)

(52) U.S. Cl.
CPC .... *F02M 25/0836* (2013.01); *F02M 25/0809* (2013.01); *F02M 25/089* (2013.01)

(58) Field of Classification Search
USPC .......................................... 73/114.38, 114.43
See application file for complete search history.

(56) References Cited

U.S. PATENT DOCUMENTS 4,285,440 A 8/1981 Adams
4,376,446 A 3/1983 Liff
5,146,902 A 9/1992 Cook et al.
5,669,361 A 9/1997 Weissinger et al.
5,675,073 A * 10/1997 Otsuka ................ G01M 3/3236 73/40.5 R
6,000,720 A 12/1999 Iannarelli et al.
6,041,648 A * 3/2000 Angermaier ....... F02M 25/0809 73/114.39
7,562,560 B1 * 7/2009 Perry ................ F02M 25/0827 73/49.7
2003/0061864 A1 * 4/2003 Wong ................. F02M 25/0809 73/40
2004/0085200 A1 * 5/2004 McConnel .......... G01F 23/0076 340/450.2
2004/0182136 A1 * 9/2004 Halla .................. B67D 7/3209 73/49.2
2005/0126265 A1 * 6/2005 Herzog .............. G01M 3/3236 73/49.2
2009/0007641 A1 * 1/2009 Haag ....................... G01M 3/32 73/49.7

(Continued)

*Primary Examiner* — Eric S McCall
(74) *Attorney, Agent, or Firm* — James Dottavio; McCoy Russell LLP

(57) ABSTRACT

Methods and systems are provided for detecting a fuel tank oil-canning event during conditions when a vacuum is applied to the fuel tank, such as during a fuel system leak test or during purging of a fuel system canister. In one example, a method may include comparing the fuel tank pressure changes during a leak test to changes in fuel tank temperature or fill level and indicating fuel tank oil-canning in response to a higher than threshold rise in fuel tank pressure during or following application of vacuum to the fuel tank while each of a fuel temperature and fill level remain unchanged. By detecting fuel tank oil-canning accurately, appropriate countermeasures can be taken.

20 Claims, 5 Drawing Sheets

(56) References Cited

U.S. PATENT DOCUMENTS

| | | | | |
|---|---|---|---|---|
| 2009/0314072 | A1* | 12/2009 | Slusser | B60K 15/0406 73/114.43 |
| 2010/0064774 | A1* | 3/2010 | Drane | F02M 25/089 73/40 |
| 2012/0234074 | A1* | 9/2012 | Hagen | G01F 1/32 73/1.73 |
| 2014/0019002 | A1 | 1/2014 | Jentz et al. | |
| 2014/0130781 | A1* | 5/2014 | Jentz | F02M 25/0809 123/520 |
| 2014/0257721 | A1* | 9/2014 | Thompson | G01M 3/226 702/51 |
| 2015/0121999 | A1* | 5/2015 | Dudar | F02D 41/221 73/114.39 |
| 2015/0198103 | A1* | 7/2015 | Dudar | F02M 25/0809 701/102 |
| 2015/0198123 | A1* | 7/2015 | Pearce | B60K 15/03504 123/520 |

* cited by examiner

METHODS AND SYSTEMS FOR DIAGNOSING FUEL TANK OIL-CANNING

FIELD

The present description relates to systems and methods for detecting fuel tank oil-canning in an engine fuel system coupled in a vehicle.

BACKGROUND/SUMMARY

Vehicles may be fitted with evaporative emission control systems (EVAP) to reduce the release of fuel vapors to the atmosphere. For example, a fuel vapor canister packed with an adsorbent may adsorb and store refueling, running loss, and diurnal fuel vapors. At a later time, when the engine is in operation, the evaporative emission control system allows the vapors to be purged into the engine intake manifold for use as fuel.

Since leaks in the emissions control system can inadvertently allow fuel vapors to escape to the atmosphere, leak detection routines may be intermittently performed. Therein, a negative pressure is applied on the fuel system (such as engine manifold vacuum or negative pressure from an alternate vacuum source) until a target vacuum is reached, following which the fuel system is sealed and a rate of pressure decay is monitored. Based on the rate of pressure bleed-up, fuel system leaks may be identified.

Based on the ideal gas law, a sudden change in fuel tank pressure can be attributed to various factors, such as quantity of fuel in the fuel tank, fuel volume, and fuel temperature. While the fuel tank is designed to withstand the negative pressure applied during a leak test, as well as some pressure fluctuations, there may be conditions when there is more vacuum in the fuel tank than commanded. As an example, if there is a leaky canister purge valve, more vacuum may be applied to the fuel tank than desired. If the fuel tank has excessive vacuum, fuel tank oil-canning may occur wherein the fuel tank volume may suddenly change and tank integrity may be compromised. The fuel tank may flex and damage one or more sensors and actuators coupled to the tank, such as a fuel level indicator and a fuel pump. Rapid and accurate identification of oil-canning may be required to take countermeasures to reduce fuel tank damage.

The inventors herein have recognized that during oil-canning events, there may be a momentary, and drastic, change in fuel tank volume and pressure. By ruling out other factors that affect fuel tank pressure, a sudden pressure rise may be correlated with an oil-canning event, and appropriate mitigating steps may be taken in a timely fashion. Thus in one example, fuel tank oil-canning may be accurately diagnosed by a method comprising: indicating fuel tank oil-canning in response to a higher than threshold rise in fuel tank pressure during or following application of vacuum to the fuel tank while each of a fuel temperature and fill level remain within a range.

As an example, a vacuum (e.g., an intake manifold vacuum) may be applied to a fuel tank when leak test conditions are met, or when canister purging conditions are met. If a sudden drop in fuel tank vacuum and/or a sudden drastic rise in fuel tank pressure is seen following application of vacuum to the fuel tank, a controller may perform a diagnostic routine to determine if the sudden change in fuel tank pressure is due to oil-canning at the fuel tank. Specifically, oil-canning may be inferred if the change in fuel tank pressure cannot be attributed to any change in fuel tank temperature (e.g., due to the tank temperature staying substantially constant) or change in fuel vapor amount (e.g., due to no fuel sloshing events) incurred during the vacuum application. If oil-canning is inferred, the application of vacuum may be discontinued and the fuel tank may be vented to the atmosphere to relieve pressure and protect the fuel tank. In this way, oil-canning may be detected rapidly and accurately. By improving the accuracy of oil-canning detection, appropriate mitigating steps may be taken to reduce the unintended degradation of the fuel tank and one or more sensors and actuators coupled to it. Overall, fuel system integrity can be better maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
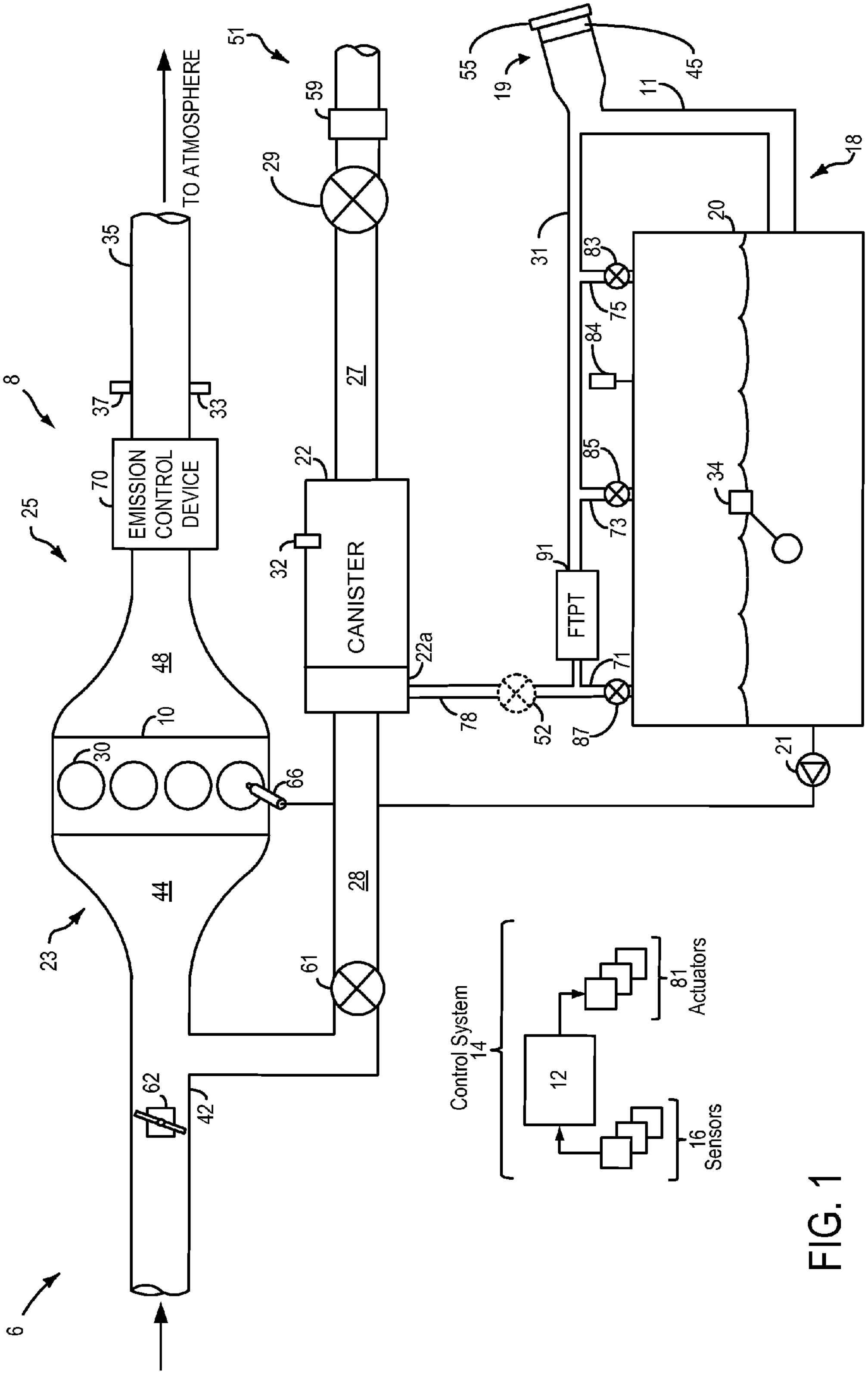
FIG. 1 shows a schematic depiction of an engine fuel system.

The following description relates to systems and methods for detecting oil-canning of a fuel tank coupled in an engine fuel system, such as the engine system of FIG. 1. Oil-canning may occur during canister purging if a fresh air line to the canister is restricted or during a leak test if the canister purge valve is leaky. A controller may be configured to perform a routine, such as the routine of FIG. 3, to monitor a fuel tank pressure during conditions when a vacuum is applied to the fuel tank (such as during the purging and leak test routines of FIG. 2), to determine if an increase in fuel tank pressure during or following application of the vacuum to the fuel tank is due to oil-canning. Changes in fuel tank pressure experienced during a leak test due to oil-canning are shown with reference to FIGS. 4A-B. An example detection of fuel tank oil-canning based on changes in a fuel tank pressure, a fuel tank temperature and a fuel tank fill level is shown at FIG. 5. In response to the detection of oil-canning, the fuel tank may be unsealed and application of vacuum may be discontinued until sufficient pressure relief is achieved. In this way, by accurately identifying fuel tank oil-canning and taking appropriate measures, the fuel tank may be protected from degradation.

FIG. 1 shows a schematic depiction of a vehicle system 6. The vehicle system 6 includes an engine system 8 coupled to an emissions control system 51 and a fuel system 18. Emission control system 51 includes a fuel vapor container or canister 22 which may be used to capture and store fuel vapors. In some examples, vehicle system 6 may be a hybrid electric vehicle system.

The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

The fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Fuel tank 20 may hold a plurality of fuel blends, including fuel with a range of alcohol concentrations, such as various gasoline-ethanol blends, including E10, E85, gasoline, etc., and combinations thereof. Vapors generated in fuel system 18 may be routed to an evaporative emissions control system 51, which includes a fuel vapor canister 22, via vapor recovery line 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in the fuel vapor canister 22 may be purged to engine intake 23 by opening a canister purge valve 61. While a single canister 22 is shown, it will be appreciated that fuel system 18 may include any number of canisters. In one example, the canister purge valve 61 may be a solenoid valve wherein opening or closing of the valve is performed via actuation of a canister purge solenoid.

Canister 22 may include a buffer **22*a* (or buffer region), each of the canister and the buffer comprising the adsorbent. As shown, the volume of buffer 22*a* may be smaller than (e.g., a fraction of) the volume of canister 22. One or more temperature sensors 32 may be coupled to and/or within canister 22**.

Canister 22 includes a vent 27 for routing gases out of the canister 22 to the atmosphere when storing, or trapping, fuel vapors from the fuel tank 20. Vent 27 may also allow fresh air to be drawn into fuel vapor canister 22 when purging stored fuel vapors to engine intake 23 via purge line 28 and canister purge valve 61. While this example shows vent 27 communicating with fresh, unheated air, various modifications may also be used. In some examples, vent line 27 may include an air filter 59 disposed therein upstream of a canister 22. Vent 27 may include a canister vent valve 29 to adjust a flow of air and vapors between canister 22 and the atmosphere. The canister vent valve 29 may also be used for diagnostic routines. The canister vent valve 29 may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the canister vent valve 29 may be opened to allow a flow of fresh air to strip the fuel vapors stored in the canister. In one example, canister vent valve 29 may be a solenoid valve wherein opening or closing of the valve is performed via actuation of a canister vent solenoid. In particular, the canister vent valve may be an open valve that is closed upon actuation of the canister vent solenoid. By closing the canister vent valve, the fuel tank may be sealed from the atmosphere. In some embodiments, such as in hybrid-electric vehicles, fuel tank 20 may be coupled to canister 22 via a fuel tank isolation valve 52. When included, the fuel tank isolation valve 52 (FTIV) may be closed to seal the fuel tank 20 from the atmosphere and may be opened to vent fuel tank vapors to canister 22. In one example, the FTIV 52 may be positioned between the fuel tank 20 and the fuel vapor canister 22 within a conduit 78.

Vapor recovery line 31 may be coupled to fuel tank 20 via one or more conduits 71, 73 and 75 and may include one or more valves for isolating the fuel tank during certain conditions. Further, in some examples, one or more fuel tank vent valves 87, 85 and 83 may be included in conduits 71, 73, or 75. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 71 may include a grade vent valve (GVV) 87, conduit 73 may include a fill limit venting valve (FLVV) 85, and conduit 75 may include another grade vent valve (GVV) 83. Further, in some examples, recovery line 31 may be coupled to a fuel filler system 19. In some examples, fuel filler system may include a fuel cap 55 for sealing off the fuel filler system from the atmosphere. Refueling system 19 is coupled to fuel tank 20 via a fuel filler pipe or neck 11.

Further, refueling system 19 may include refueling lock 45. In some embodiments, refueling lock 45 may be a fuel cap locking mechanism or a filler pipe valve located at a mouth of fuel filler pipe 11 or a refueling door lock. The refueling lock 45 may be unlocked by commands from controller 12, for example, when a fuel tank pressure decreases below a pressure threshold or may be unlocked via a pressure gradient, for example, when a fuel tank pressure decreases to atmospheric pressure.

The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 20, the vent valves may be open or closed. For example, GVV 87 may be normally open allowing for diurnal and "running loss" vapors from the fuel tank to be released into canister 22, preventing over-pressurizing of the fuel tank. However, during vehicle operation on an incline, when a fuel level as indicated by fill level sensor or fuel level indicator 34 is artificially raised on one side of the fuel tank, GVV vent valve 87 may close to prevent liquid fuel from entering vapor line 31. As another example, FLVV 85 is normally open, however during fuel tank refilling, vent valve 85 may close, causing pressure to build in line 31 as well as at a filler nozzle coupled to the fuel pump. The increase in pressure at the filler nozzle may then trip the refueling pump, stopping the fuel dill process automatically, and preventing overfilling.

As depicted, a fill level sensor or fuel level indicator 34 may comprise a float connected to a variable resistor. The output of the fill level sensor 34 located in the fuel tank 20 may provide an estimate of the amount of fuel stored in the fuel tank. The output of the fill level sensor 34 may be used to control engine operation parameters such as fuel injection amount, exhaust gas recirculation, canister purging, and refueling for example. During vehicle maneuvers such as a sweeping left turns or right turns (e.g., vehicle turns at speeds that are higher than a threshold speed and/or vehicle turns at higher than threshold turn speeds), uphill vehicle travel (e.g., vehicle travel along an incline that is higher than a threshold grade), and travel along a bumpy road (e.g., vehicle travel along a track having a lower than threshold smoothness), fuel can slosh. Still other maneuvers that may cause fuel sloshing include vehicle travel along undulating track surfaces, aggressive braking maneuvers, and vehicle acceleration along any axis. Fuel slosh may be inferred based on vehicle motion, as inferred from a vehicle motion sensor, and/or changes in fuel tank pressure. Specifically, fuel slosh generates additional fuel vapors in the fuel tank that may in turn cause fluctuations in fuel tank pressure, as determined from the output of a fuel tank pressure sensor, such as sensor 91, for example. As elaborated herein with reference to FIG. 3, a controller may be able to distinguish fuel tank pressure fluctuations due to a fuel tank oil-canning event from those due to fuel slosh based on correlations between fuel tank pressure changes and concurrent changes in vehicle motion (e.g., as measured by a vehicle motion sensor) and/or a fuel tank fill level (e.g., as measured by fill level sensor 34).

One or more temperature sensors may also be coupled to fuel system 18 for providing an estimate of a fuel system temperature. In one example, the fuel system temperature is a fuel tank temperature, wherein temperature sensor 84 is a fuel tank temperature sensor coupled to fuel tank 20. While the depicted example shows temperature sensor 84 directly coupled to fuel tank 20, in alternate embodiments, the temperature sensor may be coupled between the fuel tank 20 and canister 22. A sudden change in fuel tank pressure may be caused by a sudden change in fuel tank temperature. As elaborated herein with reference to FIG. 3, a controller may be able to distinguish fuel tank pressure fluctuations due to a fuel tank oil-canning event from those due to fuel temperature fluctuations based on correlations between fuel tank pressure changes and concurrent changes in fuel tank temperature (e.g., as measured by temperature sensor 84).

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open the canister vent valve 29 while closing canister purge valve 61 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open the canister vent valve 29, while maintaining the canister purge valve 61 closed, to depressurize the fuel tank before allowing enabling fuel to be added therein.

As yet another example, the fuel system may be operated in a canister purging mode (e.g., after an emission control device light-off temperature has been attained and with the engine running), wherein the controller 12 may open the canister purge valve 61 and the canister vent valve 29. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. However during purging, if the fresh air line is restricted, or the canister vent valve is stuck closed, for example, the fuel tank may be subjected to more vacuum than commanded and the fuel tank integrity may be compromised. During such conditions, purging may be discontinued to pre-empt oil-canning of a fuel tank as described in FIGS. 2 and 3.

Controller 12 may also be configured to intermittently perform leak detection routines on fuel system 18 (e.g., fuel vapor recovery system) to confirm the integrity of the fuel system. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value).

In one example, to perform an engine-on leak test, negative pressure generated at engine intake 23 is applied on the fuel system by opening a canister purge valve 61 and closing a canister vent valve 29, for example, until a threshold level of fuel tank vacuum is reached. When included, the fuel tank isolation valve 52 (FTIV) may alternately be closed to seal the fuel tank 20 from the atmosphere. In other examples, an evaporative leak check module (ELCM) (not shown) may be coupled to fuel system 18, for example, in vent 27 between canister vent valve 29 and atmosphere. The ELCM may include a pressure generating means (e.g., a vacuum pump or a positive pressure pump), and may be connected to the fuel system via one or more actuatable valves, allowing for one or more sections of the fuel system to be isolated for leak testing. Once the target vacuum is reached, the canister purge valve 61 may be closed to discontinue application of vacuum to the fuel tank 20. Additionally, the canister vent valve 29 may be kept closed to isolate the fuel system. Based on a rate of pressure bleed-up (to atmospheric pressure) and a final stabilized fuel system pressure, the presence of a fuel system leak may be determined. However, if the canister purge valve 61 is leaky, the fuel tank 20 may be subjected to more vacuum than commanded and tank integrity may be compromised. The controller 12 may be configured to perform an oil-canning diagnostic routine, illustrated at FIGS. 2-3, to identify a fuel tank oil-canning event responsive to fuel tank pressure fluctuations experienced during a leak test.

In alternate examples, the leak test may be a positive pressure leak test wherein a positive pressure (e.g., from an ELCM positive pressure pump) may be applied to the fuel tank until a threshold pressure level has been reached. Based on a rate of pressure bleed-down to atmospheric pressure and a final stabilized fuel system pressure, the presence of a fuel system leak may be determined.

Controller 12 may comprise a portion of a control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 37 located upstream of the emission control device, exhaust temperature sensor 33, fuel tank temperature sensor 84, fill level sensor 34, and fuel tank pressure sensor 91. Other sensors such as pressure, temperature, air/fuel ratio, vehicle motion and composition sensors may be coupled to various locations in the vehicle system 6.

As another example, the actuators 81 coupled to control system 14 may include fuel injector 66, canister vent valve 29, fuel tank isolation valve 52 (when included), canister purge valve 61, throttle 62, and refueling lock 45. The control system 14 may include a controller 12. The controller may receive input data from the various sensors, process the input data, and trigger the actuators in response to the processed input data based on instruction or code programmed therein corresponding to one or more routines. Example routines are shown with reference to FIGS. 2-3.

Figure 2:
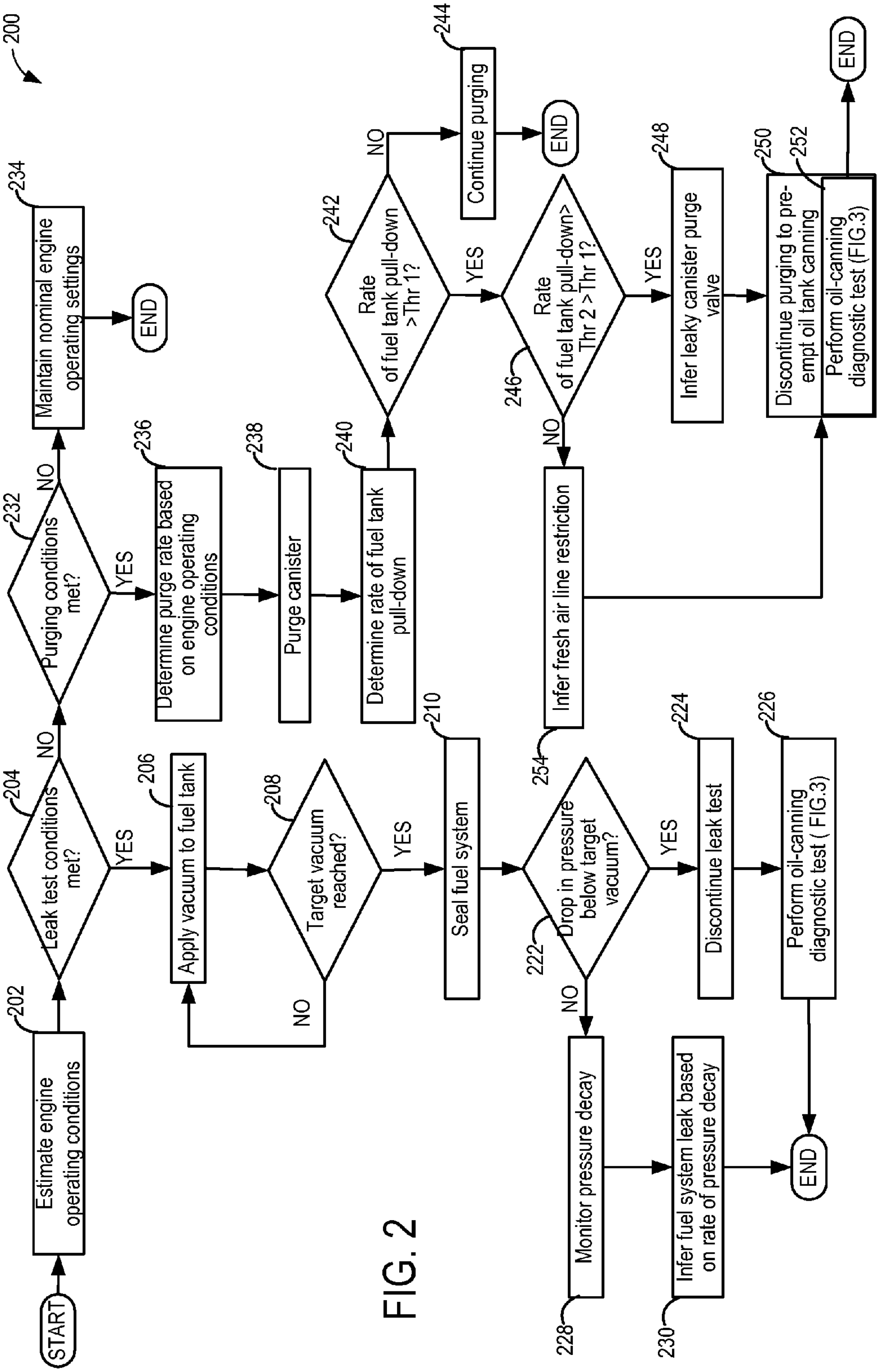
FIG. 2 shows a high level flow chart depicting a method for diagnosing an oil-canning event during a leak test of a fuel tank and/or during purging of a fuel system canister, according to the present disclosure.

As discussed above, fuel tank oil-canning may occur during conditions when vacuum is applied to the fuel tank, such as during canister purging or during a fuel system leak. Early detection of oil-canning allows appropriate countermeasures to be taken in a timely manner to maintain fuel tank integrity. FIG. 2 shows an example method 200 for detecting fuel tank oil-canning based on a change in fuel tank pressure during a fuel system leak test or during purging. The fuel tank pressure may be determined from a fuel tank pressure sensor, such as based on the output of fuel tank pressure sensor 91 shown in FIG. 1 for example. A controller may be configured with instructions stored in non-transitory memory that when executed cause the controller to perform the method 200 described below.

At 202 of method 200, the routine includes estimating and/or measuring engine operating conditions. Engine operating conditions determined may include, for example, engine speed, engine temperature, exhaust air-fuel ratio, exhaust temperature, fuel level in the fuel tank, ambient conditions such as barometric pressure and ambient temperature, fuel tank pressure, fuel tank temperature, vehicle motion data etc. At 204 of method 200, the routine includes determining if engine-running leak test conditions are met. Engine-running leak tests may be typically performed during vehicle cruising conditions. Thus, engine-running leak test conditions may be considered met if steady-state vehicle speed is greater than a threshold speed (e.g., greater than 40 mph), fuel tank fill level is within a threshold fill range (e.g., between 15-90% full), ambient temperature is within a threshold temperature range (e.g., within 40-95° F.), and ambient altitude is less than a threshold (e.g., less than 8500 feet). The leak test conditions may be considered met if all of the above conditions are fulfilled and a leak test may be initiated by the controller at 206. If one or more of the leak test conditions are not fulfilled, then the leak conditions may not be considered met and a leak test may not be initiated by the controller.

If leak conditions are not met at 204, method 200 proceeds to 232 where it may be determined if purging conditions are met. Purging conditions may be determined based on various engine and vehicle operating parameters. For example, purge conditions may be confirmed based on an engine-on condition being confirmed, an amount of hydrocarbons stored in the fuel vapor canister being greater than a threshold amount, the temperature of an emission control device being greater than a threshold temperature, a number of engine starts since a last purge operation being greater than a threshold number, and/or a longer than threshold duration having elapsed since the last purge operation.

If purging conditions are not met at 232, method 200 may proceed to 234, where nominal engine operation settings may be maintained and the method may exit. However, if purging conditions are considered met, method 200 may proceed to 236, where a purge rate may be determined based on engine operating conditions. For example, the purge rate may be based on canister load, a combustion air-fuel ratio, and an engine speed-load. The method may then proceed to 238 where the canister may be purged to the engine intake at the determined purge rate. Purging the canister may include, opening a canister purge valve coupled between a fuel system canister and an engine intake manifold. In this way, engine intake vacuum may be applied to the fuel tank via the canister, thereby using engine intake vacuum to draw fuel vapors from the canister into the engine for combustion. The opening of the canister purge valve may be adjusted based on the determined purge rate, the opening of the purge valve increased as the determined purge rate increases. Purging the canister may further include opening a canister vent valve to allow atmospheric air to be drawn into the canister.

Based on a degree of opening of the canister purge valve, as well as a duration of purging, an amount of vacuum pulled down in the fuel tank may vary. As such, the rate of vacuum pull-down in the fuel tank (or rate of rise in fuel tank vacuum level) may be correlated with the canister purge rate. At 240, a rate of vacuum pull-down in the fuel tank may be estimated and at 242, the estimated vacuum pull-down rate may be compared to a first threshold Thr1. The first threshold Thr1 may be based on a degree of opening of the canister purge valve or on the canister purge rate determined at 236, for example. If the rate of fuel tank vacuum pull-down is not greater than Thr1, then method 200 may proceed to 244, where purging of the canister may be continued. However, if the canister purge valve is leaky, wherein the canister purge valve is open more than commanded (e.g., stuck fully open when commanded to be partially open), then the fuel tank vacuum pull-down rate may be greater than first threshold Thr1. Likewise, if the fresh air line (herein also referred to as the vent line) delivering atmospheric air to the canister via the canister vent valve is restricted (e.g., due to vent line clogging with dirt), the fuel tank pull down rate may be greater than threshold Thr1. If the fuel tank vacuum pull-down rate is higher than the first threshold (Thr1), then at 246, the fuel tank vacuum pull-down rate may be compared to a second threshold, Thr2 greater than the first threshold Thr1. The second threshold Thr2 may be a higher threshold set to detect large leaks in the canister purge valve. In one example, the second threshold may also be adjusted based on the canister purge rate. Further still, the second threshold Thr2 may be adjusted based on the first threshold Thr1. If the fuel tank vacuum pull-down rate is not greater than the second threshold Thr2, but greater than the first threshold Thr1, then method 200 may proceed to 254 where it may be inferred that the fresh air line is restricted. The controller may set a diagnostic code to indicate that the fresh air line is restricted, for example, due to clogging of the fresh air line. The method 200 may then proceed to 250 wherein in response to the inference of fresh air line restriction, canister purging may be discontinued by closing the canister purge valve. Furthermore, a fuel tank oil-canning diagnostic routine, as described in FIG. 3, may be initiated at 252 to reduce fuel tank damage. Canister purging may be resumed after the fresh air line restriction is addressed.

However, if the rate of fuel tank vacuum pull-down is greater than the second threshold Thr2, then method 200 may then proceed to 248, where it may be inferred that the canister purge valve is leaky. The controller may set a diagnostic code to indicate that the canister purge valve is stuck open. The method subsequently proceeds to 250, wherein purging may be discontinued by closing the canister purge valve. As an example, if the canister purge valve is stuck open, more vacuum may be applied to the fuel tank than desired and fuel tank oil-canning may occur wherein the fuel tank volume may suddenly change and tank integrity may be compromised. Furthermore, a fuel tank oil-canning diagnostic routine, as described in FIG. 3, may be initiated at 252 to reduce fuel tank damage.

As such, a fuel tank oil-canning event may also occur during a leak test. Hence returning to 204 of method 200, if leak conditions are considered met, method 200 may proceed to 206, where vacuum or negative pressure may be applied to the fuel tank. In one example, negative pressure generated in the engine intake may be applied on the fuel system by opening the canister purge valve until a threshold level of vacuum is reached. Alternately, a vacuum pump in an evaporative leak check module (ELCM) coupled to the fuel system may be used to apply the vacuum. When included, the fuel tank isolation valve may be opened to enable vacuum to be applied to the fuel tank.

After applying vacuum to the fuel tank at 206, method 200 may proceed to 208 where it may be determined if a target vacuum has been reached. The target vacuum may be based on fuel tank fill level. Alternatively, the target vacuum may be a predefined amount of vacuum, such as −8 inches of water. Engine intake vacuum may continue to be applied to the fuel tank until the target vacuum is reached.

Once the target vacuum level in the fuel tank is reached, the application of vacuum may be discontinued and the method may proceed to 210 where the fuel system is sealed. Application of vacuum to the fuel system may be discontinued by closing the canister purge valve coupling the canister to the engine. Alternately, this may be achieved by turning off the vacuum pump, for example. In addition to closing the canister purge valve, one or more of a canister vent valve coupled between the fuel system and atmosphere and a fuel tank isolation valve coupled between the fuel system canister and the fuel tank may be closed (or kept closed) to seal the fuel system. As such, once the fuel system is sealed and the application of vacuum is discontinued, the fuel tank vacuum level may stabilize before the vacuum starts to dissipate through a reference orifice of the fuel system.

At 222 of method 200, it may be determined if the pressure in the fuel tank continues to drop below the target vacuum level even after the application of vacuum has been discontinued. In one example, the fuel tank pressure may continue to drop below the target vacuum due to a leaky canister purge valve, wherein the canister purge valve is stuck open (when commanded to be closed). If the fuel tank pressure continue to drop below the target vacuum after the canister purge valve is closed, method 200 may proceed to 224 where the leak test may be discontinued and at 226, a fuel tank oil-canning diagnostic routine (described in FIG. 3) may be initiated. However, if there is no drop in pressure when checked at 222, indicating that there is no oil-canning of fuel tank, the method 200 may proceed to 228 where the fuel tank seal may be maintained and a pressure decay may be monitored. Method 200 may then proceed to 230 where a fuel system leak may be diagnosed based on the rate of pressure decay from the target vacuum, as described in FIG. 4A.

Figure 3:
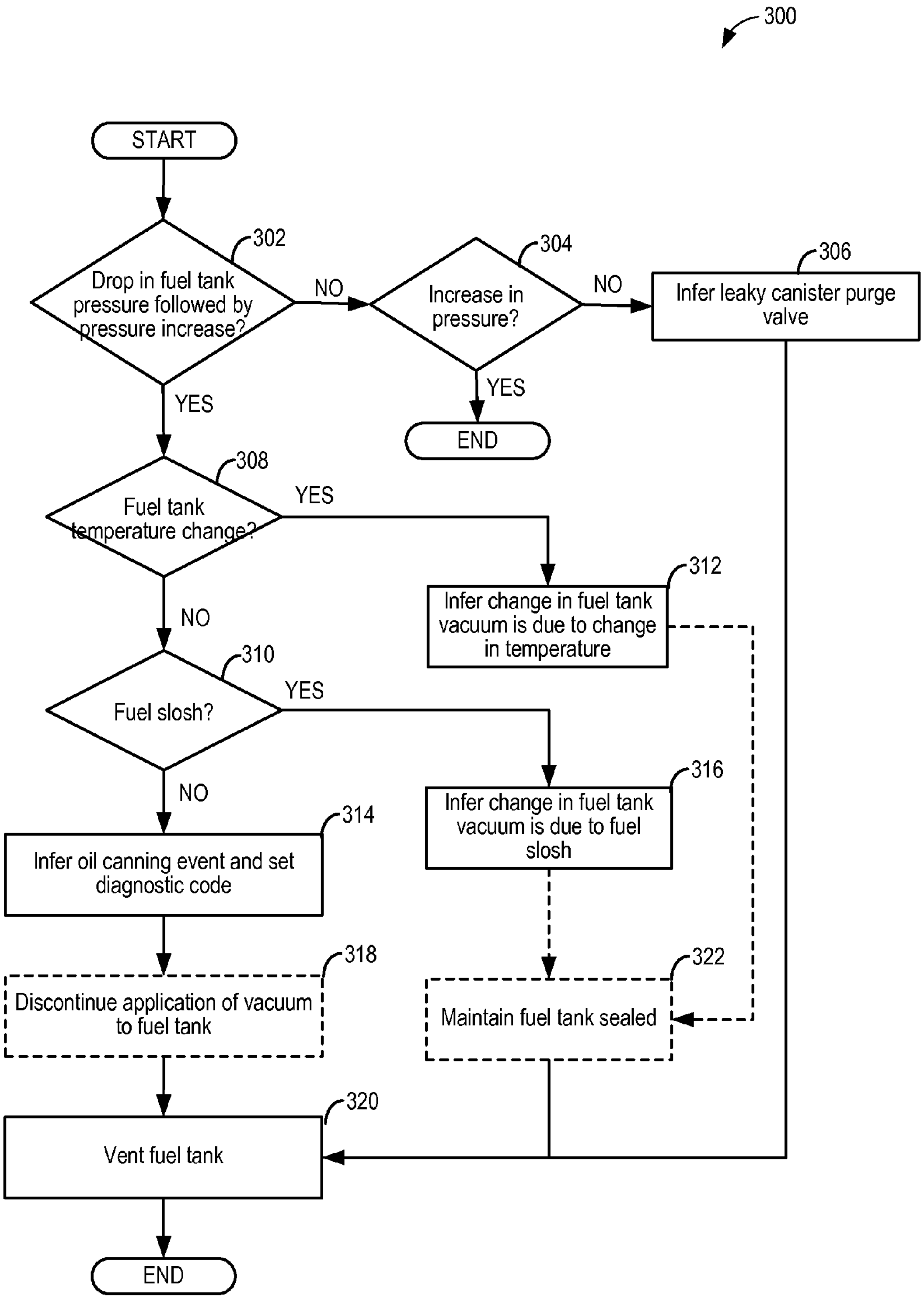
FIG. 3 shows a high level flow chart depicting a method for inferring a fuel tank oil-canning event according to the present disclosure.
Figure 4A:
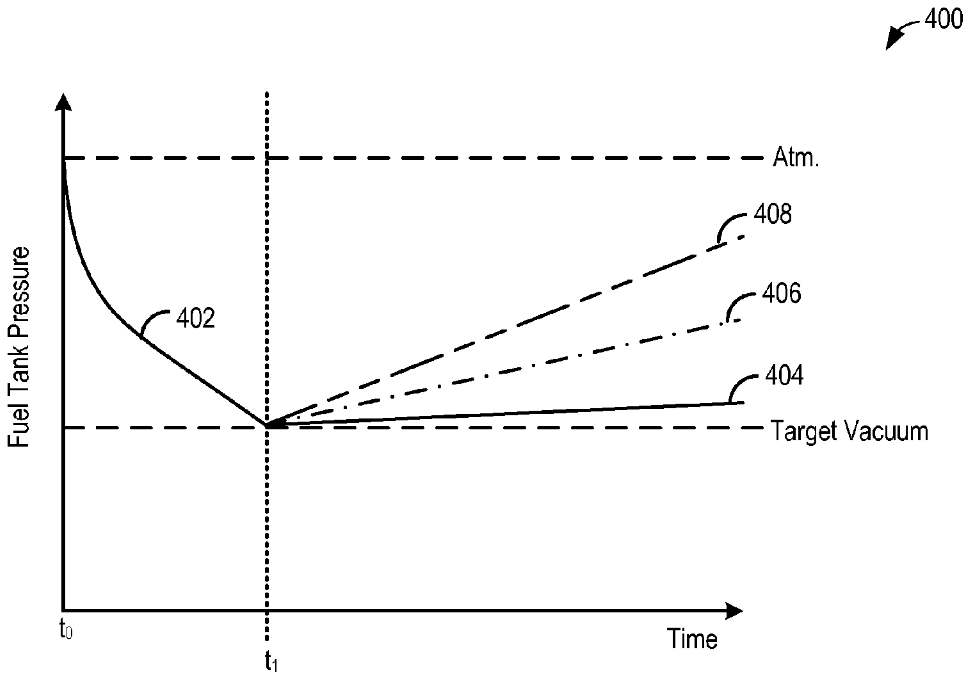
FIG. 4A shows a diagram illustrating example fuel tank pressure changes during a fuel system leak detection test.

FIG. 4A includes plot 400 illustrating pressure change in a fuel tank following the application of negative pressure during a leak detection test. Time is illustrated along the horizontal axis, and pressure is illustrated along the vertical axis. Atmospheric pressure is indicated by the dashed line at the top of the vertical axis. Negative pressure or engine intake vacuum is applied to the fuel system by opening a canister purge valve (between t0 and t1), while holding a canister vent valve closed. As the vacuum is applied, the pressure in the fuel tank decreases as shown by curve 402. At time $t_1$ of plot 400, when the fuel system pressure reaches the target vacuum level, the application of pressure may be stopped, by closing the canister purge valve, or turning off a vacuum pump, for example. Once the application of vacuum has ceased, pressure may slowly rise back towards atmospheric pressure as the pressure dissipates through a reference orifice of the fuel system. A fuel system that does not include a leak may have a rate of pressure rise (or rate of vacuum decay) illustrated by curve 404. However, if the fuel system is degraded and a leak is present, the pressure may increase faster. A size of the leak orifice may be determined based on the rate of pressure change. For example, curve 406 illustrates a fuel system with a leak orifice of a smaller size, and thus the rate of pressure change is greater than the rate illustrated by curve 404 but less than the rate of change of a fuel system with a leak orifice of larger size, illustrated by curve 408. The engine control system may have a map corresponding to the rate of applied pressure (shown by curve 402), rate of pressure change expected with no leak (shown by curve 404), and rate of pressure change expected with the reference orifice, illustrated by curve 406, for example. The pressure change curve for the system with a leak of a known size may represent a leak orifice size that is small enough to be tolerated, and thus a rate that is greater than the known leak orifice size may trigger an indication that the fuel system is degraded. Furthermore, a change in the rate of applied pressure, illustrated by curve 402, may also indicate a degraded fuel system. For example, if the fuel system does not reach the threshold pressure, a leak may be indicated. However, if the fuel tank pressure continues to decrease even after closing the canister purge valve or turning off the vacuum pump, as shown in FIG. 4B, an additional diagnostic routine, such as the one described in FIG. 3, may be performed by the controller to determine the reason for this pressure drop.

Figure 4B:
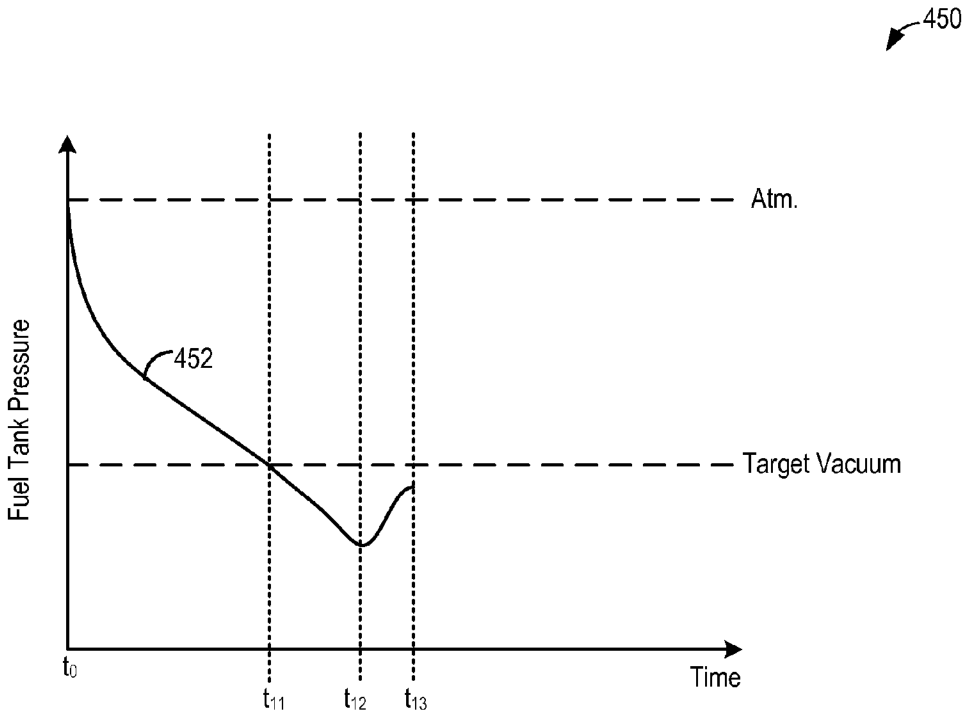
FIG. 4B shows a diagram illustrating an example fuel tank pressure change during an oil-canning event occurring while a fuel system leak test is performed.
Figure 5:
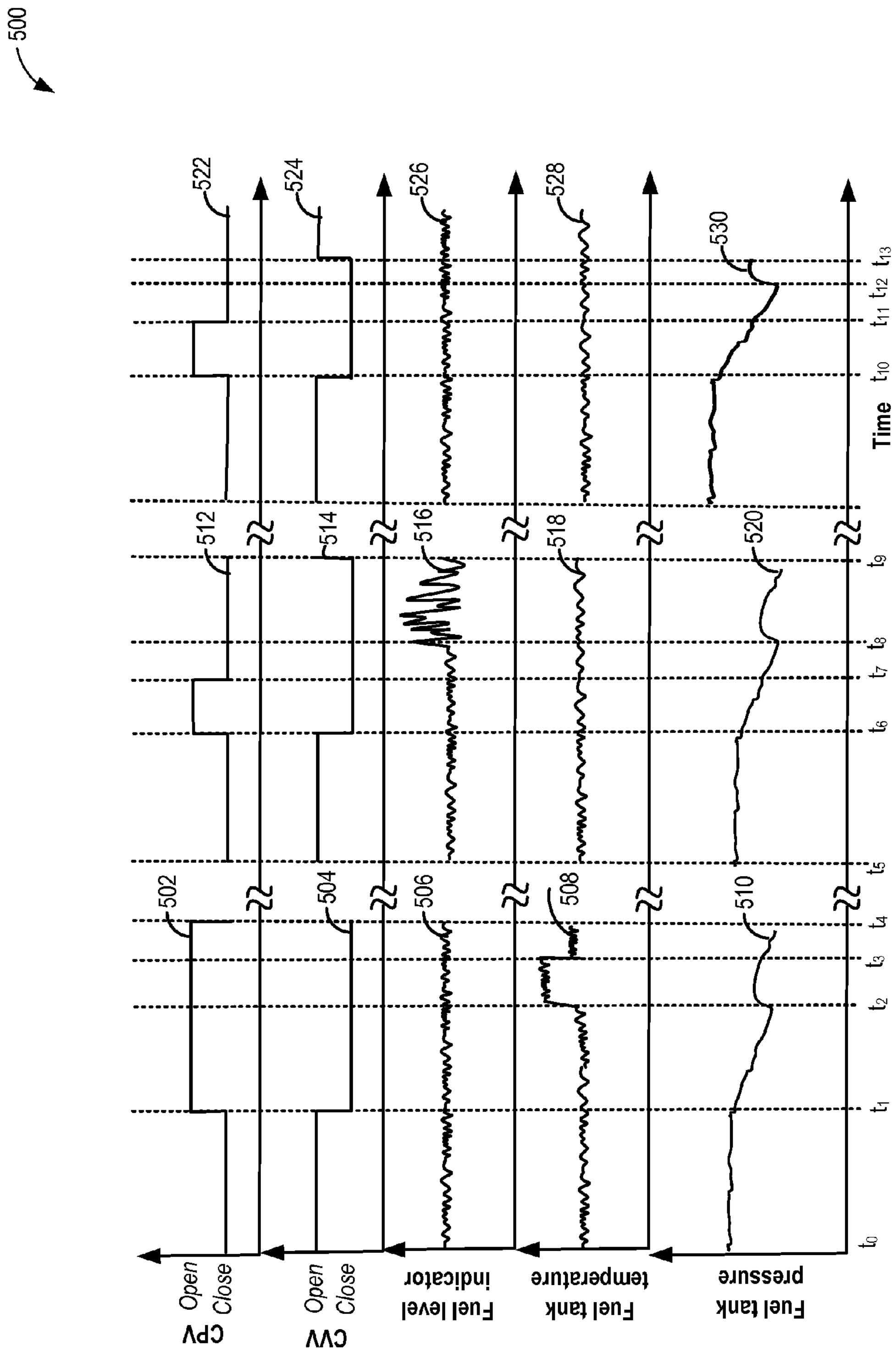
FIG. 5 shows an example relationship between fuel tank pressure, fuel tank temperature and fuel tank fill level during a fuel tank oil-canning event.

Turning now to FIG. 4B, map 450 shows a diagram illustrating an example fuel tank pressure drop below target vacuum during a leak test. Vacuum may be applied to the fuel tank (from the engine intake or a vacuum pump) between $t_0$ and $t_{11}$. At time $t_{11}$ of map 450, upon reaching the target vacuum level, the application of pressure may be stopped, by closing the canister purge valve, for example, or by turning off the vacuum pump as explained earlier. However, between $t_{11}$ and $t_{12}$, the pressure may continue to decrease below the target vacuum as seen by curve 452. This may be due to a leaky canister purge valve, for example. If the leak in the canister purge valve is small, or below a threshold for example, vacuum may continue to build up after closing the canister purge valve as shown by curve 452 and tank collapse may be pre-empted by merely unsealing the fuel tank by opening a canister vent valve (and a fuel tank isolation valve, when included) for example. However, if the canister purge valve is stuck open, for example, more vacuum than commanded may be delivered to the fuel tank.

If the fuel tank has excessive vacuum, fuel tank oil-canning may occur wherein the fuel tank volume may change abruptly and tank integrity may be compromised. The fuel tank may flex causing the fuel tank pressure to rise due to a sudden volume change in the tank geometry, as shown by curve 452 between $t_{12}$ and $t_{13}$. The controller may perform a diagnostic routine, such as the routine of FIG. 3, to determine if the sudden change in fuel tank pressure is due to oil-canning of the fuel tank. In an alternate example, there may be a sudden increase in pressure during the application of vacuum, between $t_0$ and $t_{11}$, for example. The controller may perform the oil-caning diagnostic routine irrespective of when the increase in pressure occurs. As elaborated at FIG. 3, oil-canning may be inferred in response to a higher than threshold rise in fuel tank pressure during or following application of vacuum to the fuel tank, while each of a fuel temperature and fill level remain within a range. The threshold rise may be based on the target fuel tank vacuum for example.

FIG. 3 shows a method 300 for inferring a fuel tank oil-canning event according to the present disclosure. The method of FIG. 3 may be performed during a purging routine or during a leak detection routine, as elaborated at FIG. 2. Specifically, the method 300 is initiated during purging in response to faster than expected (based on the purge rate) drop in fuel tank vacuum. The method is also initiated during a leak detection routine in response to a drop in fuel tank vacuum after application of vacuum is discontinued, or responsive to a sudden rise in fuel tank pressure during or following the application of vacuum. The method allows fuel tank pressure changes due to an oil-canning event at the fuel tank to be better distinguished from those due to a change in fuel system temperature or due to fuel slosh. Appropriate mitigating steps may accordingly be taken.

At 302 of method 300, it may be checked if there is a drop in fuel tank pressure followed by an increase in pressure. For example, it may be determined if the fuel tank pressure drops below a target vacuum level followed the fuel tank pressure rising by a higher than a threshold rate (or amount). If the output is NO, then method 300 may proceed to 304, where it may be checked if there is an increase in fuel tank pressure. An increase in pressure may occur during a leak test once the application of vacuum to the fuel tank has ceased, due to the gradual dissipation of the applied vacuum via a reference orifice, as shown in FIG. 4A. If there is an increase in pressure, the routine may end, indicating a normal leak test. However, if there is no increase in pressure, or in other words, the pressure continues to decrease, then method may proceed to 306, where it may be inferred that the canister purge valve is leaky and the fuel system may be unsealed at 320, by opening the canister vent valve and the fuel tank isolation valve for example.

If there is a drop in fuel tank pressure followed by an increase in pressure at 302, method 300 may proceed to 308 where fuel tank temperature changes may be monitored. As described earlier, if the canister purge valve is leaky during a leak test or if the fresh air line is restricted during purging, the fuel tank may be subjected to more vacuum than commanded. This may be seen as a rapid increase in fuel tank vacuum and the leak test or the canister purging may be discontinued as explained in method 200. However, if the tank deforms due to the increased vacuum, the rapid increase in fuel tank vacuum may be masked by a pressure increase in the fuel tank due to a volume change in the fuel tank geometry. Based on the ideal gas law (PV=nRT), a sudden change in fuel tank pressure (P) can be attributed to various factors, such as fuel volume (V), amount of fuel in vapor form (n) and fuel temperature (T). At 308 of method 300, it may be determined whether the fuel tank temperature is within a range or if the fuel tank temperature has changed. The method may indicate that the fuel temperate is within a range based on output from a fuel temperature sensor coupled to the fuel tank. As such, an ambient temperature change is typically slow acting. Hence a sudden change (e.g., a sudden drop or a sudden rise) in fuel tank temperature may be infrequent. In one example, the fuel tank temperature may suddenly change due to a sudden climatic change. Other examples include, but are not limited to, sudden altitude changes, driving through heavy rain, etc.

If there is a sudden change in fuel tank temperature, then method 300 may proceed to 312, where it may be inferred that the increase in fuel tank pressure is due to a change in fuel tank temperature and not due to oil-canning. If the sudden increase in pressure as a result of a sudden increase in temperature occurs during the application of vacuum, before the target vacuum has been reached, for example, then the fuel tank may be maintained sealed at 322. However, if the sudden increase in fuel tank pressure and temperature occurs after the target vacuum has been reached, then the fuel tank may be vented at 320 to pre-empt tank damage.

However, if there was no change in fuel tank temperature, then method 300 may proceed to 310 where it may be checked if there was any fuel slosh. Fuel slosh generates additional fuel vapors (increasing n in ideal gas law PV=nRT) in the fuel tank that may result in an increase in fuel tank pressure. However, fuel slosh may be reported by other sensors such as fill level sensor or temperature sensor inside the canister, or a hydrocarbon sensor in the EVAP system or a vehicle motion sensor, for example. If the fill level changes for example, then it may be inferred that fuel slosh has occurred and method 300 may proceed to 316 where it may be inferred that the increase in fuel tank pressure may be due to fuel slosh in the fuel tank and not due to oil-canning. If the sudden increase in pressure as a result of a sudden increase in fill level occurs during the application of vacuum, before the target vacuum has been reached, for example, then the fuel tank may be maintained sealed at 322. However, if the sudden increase in fuel tank pressure and fill level occur after the target vacuum has been reached, then the fuel tank may be vented at 320 to pre-empt tank damage. When the increase in fuel tank pressure is accompanied by an increase in fuel tank temperature or fill level, then method 300 includes indicating that the drop in pressure followed by the sudden increase in pressure, was not due to oil-canning but due to changes in temperature and due to fuel slosh respectively. In addition, the fuel system may be maintained sealed.

At 314, in response to no indication of fuel slosh or fuel tank temperature fluctuation, it may be inferred that the change in fuel tank pressure is due to a fuel tank oil-canning event. Accordingly, an appropriate diagnostic code may be set. In this way, by ruling out other factors such as temperature change and vaporization, an oil-canning event may be inferred. At 318, in response to the indication of fuel tank oil-canning, application of vacuum may be discontinued, if oil-canning was identified during the application of vacuum, by closing the canister purge valve. In addition, at 320, in response to the indication of oil-canning, the fuel tank may be unsealed or vented to the atmosphere, by opening a canister vent valve (and fuel tank isolation valve, if included) for example. The technical effect of closing the canister purge valve and opening the canister vent valve is that the fuel tank may be vented to atmosphere, allowing for rapid pressure relief, and pre-empting fuel tank damage.

In some examples, the increase in pressure may occur after vacuum application and without a preceding unexpected drop in fuel tank pressure. In either case, the oil-canning diagnostic routine of FIG. 3 may be initiated responsive to the sudden rise in fuel tank pressure. As an example, a controller may seal a fuel tank after pulling down fuel tank pressure to a threshold vacuum. In response to one or more of a drop in fuel tank pressure below the threshold vacuum and a higher than threshold rise in fuel tank pressure after the sealing, while each of a fuel temperature and fill level remain within a range, the controller may unseal the fuel tank. The controller may further set a diagnostic code to indicate that the one or more of the drop in fuel tank pressure below the threshold vacuum and the higher than threshold rise in fuel tank pressure is due to fuel tank oil-canning. The controller may seal the fuel tank in response to fuel system leak detection conditions being met, and further unseal the fuel tank when fuel system leak detection is discontinued. Sealing the fuel tank coupled to a fuel system canister includes closing one or more of a canister vent valve coupled between the fuel system canister and atmosphere, and a fuel tank isolation valve coupled between the fuel system canister and the fuel tank, and unsealing the fuel tank includes opening the canister vent valve and the fuel tank isolation valve. In response to neither of a drop in fuel tank pressure below the threshold vacuum and the higher than threshold rise in fuel tank pressure after the sealing, the controller may maintain the fuel tank sealed and may further estimate a fuel system leak based on a rate of vacuum decay.

Turning now to FIG. 5, map 500 shows an example detection of a fuel tank oil-canning event based on a correlation between changes in a fuel tank pressure, a fuel tank temperature and fuel tank fill level. Plots 502, 512 and 522 show the position of the canister purge valve (CPV) during different sets of conditions. Plots 504, 514 and 524 show the position of the canister vent valve (CVV) during the corresponding conditions. Plots 506, 516 and 526 show the fuel level indicator output during the corresponding conditions. Plots 508, 518 and 528 show the fuel tank temperature sensor output while plots 510, 520 and 530 show the fuel tank pressure sensor output during the corresponding conditions mentioned above. For each plot, time is depicted along the x (horizontal) axis while values of each respective parameter are depicted along the y (vertical) axis.

At time $t_0$, while the engine is running, the fuel tank may have a pressure indicated by plot 510 and a corresponding fuel tank temperature and fill level shown by plots 508 and 506. No purging or leak detection conditions may be confirmed, and so the canister purge valve may be closed as indicated by plot 502 and the canister vent valve may be open as indicated by plot 504. At time $t_1$, it may be determined that leak test conditions are met and as a result a leak diagnostic test may be initiated. Therein, vacuum may be applied to the fuel tank at time $t_1$. In the present example, engine vacuum may be applied to evacuate the fuel tank to a target vacuum level by opening a canister purge valve as shown by plot 502. In alternate examples, an external vacuum pump may be used to evacuate the fuel system. The canister vent valve may also be closed as indicated by plot 504. The technical effect of opening the canister purge valve and closing the canister vent valve is that the engine intake vacuum may be applied on the fuel tank, and the fuel tank pressure may begin to decrease as seen in plot 510. However, the fuel tank pressure may continue to decrease and at $t_2$, there may be a sudden increase in the pressure, as shown in plot 510. At the same time, there may be a sudden change in the fuel tank temperature as shown by plot 508, while the fuel tank fill level remains unchanged as shown by plot 506. The sudden change in fuel tank temperature may be due to a sudden climate or altitude change, for example. In response to the correlated change in fuel tank pressure and fuel tank temperature, it may be determined that no fuel tank oil-canning has occurred and that the change in fuel tank pressure is due to the change in fuel tank temperature. Accordingly, at $t_3$, the leak detection routine may be continued (irrespective of whether the fuel tank temperature increase continues or returns to previous levels) and the fuel tank may be maintained sealed by keeping the canister vent valve closed for example, as shown at plot 504. At a later time $t_4$, the target vacuum level for the leak test diagnostics may be reached, and the canister purge valve may be closed as shown by plot 502 and the leak in the fuel system may be determined based on the rate of increase in pressure to atmospheric pressure as explained in FIG. 4A. Alternately, the leak test may be aborted at $t_2$ when the pressure increases with a correlated change in temperature, and the leak test may be reinitiated once the temperature has stabilized.

Another engine-running leak test is shown at $t_5$-$t_9$. At time $t_5$, the fuel tank pressure may be as indicated at plot 520, while the fuel tank temperature and fuel level indicator output are as at indicated at plots 518 and 516. At time $t_6$, it may be determined that the engine running leak test conditions are met and a leak test may be initiated as described above. The canister purge valve may be opened as shown by plot 512 and the canister vent valve (and/or fuel tank isolation valve) may be closed as shown by plot 514 to apply engine intake vacuum to the fuel tank. The fuel tank pressure may begin to decrease as seen in plot 520. At $t_7$, the target vacuum for the leak test may be reached, and the canister purge valve may be closed as shown by plot 512. However, the fuel tank pressure may continue to decrease and at $t_8$, there may be a sudden increase in the pressure, as shown in plot 520. At the same time, the fuel level indicator output may transiently fluctuate as shown by plot 516, while the fuel tank temperature output remains unchanged as shown by plot 518. When this occurs, it may be determined that no fuel tank oil-canning has occurred and that the change in fuel tank pressure is due to fuel slosh. Accordingly, at a later time $t_9$, the leak detection routine may be aborted and the fuel tank may be unsealed, by opening the canister vent valve, for example as shown at plot 514. However, if pressure increase happens due to fuel slosh when vacuum is being applied to the fuel tank (between $t_6$ and $t_7$, for example) the controller may either continue to perform the leak test and the fuel system may be vented at a later time upon completion of the leak test. Alternately, the controller may abort the leak test and may reinitiate the leak test once the fuel level indicator output becomes stabilized.

Another engine-running leak test is shown at $t_{10}$-$t_{13}$. At time $t_{10}$, the fuel tank pressure may be as indicated at plot 522, while the fuel tank temperature and fuel level indicator output are as at indicated at plots 528 and 526. At time $t_{10}$, it may be determined that the engine running leak test conditions are met and a leak test may be initiated as described above. The canister purge valve may be opened as shown by plot 522 and the canister vent valve (and/or fuel tank isolation valve) may be closed as shown by plot 524 to apply engine intake vacuum to the fuel tank. However, if the fuel tank pressure decreases and then increases at $t_{12}$ as seen in plot 530, but there is no corresponding change in either the fuel tank temperature (as seen in plot 528) of fuel level indicator output (as seen in plot 526), it may be inferred that an oil-canning event has occurred. The fuel tank may be vented immediately at $t_{13}$, by opening the canister vent valve as seen in plot 524 to prevent fuel tank collapse. In one example, the immediate reaction may be less than 1 second.

In this way, responsive to a sudden rise in fuel tank and/or a preceding sudden drop in tank vacuum, experienced while a leak detection test is being conducted, the leak test may be immediately aborted and a cause of the sudden rise in pressure may be determined. If the cause of the pressure rise is attributed to fuel tank oil-canning, in addition to aborting the leak test, the fuel tank may be immediately vented to reduce the possibility of fuel tank damage. In addition, further leak tests may be delayed until the fuel tank has been assessed. If the cause of the pressure rise is not due to oil-canning, while the leak test is immediately aborted, the venting of the fuel tank may be delayed until the fuel pressure and/or of the cause of the rise in fuel pressure has stabilized. After the venting, when the leak detection conditions are met, the leak test may be reinitiated by applying vacuum. It will be appreciated that in still other examples, if the rise in fuel tank pressure is higher than a threshold level, irrespective of the cause of the rise, the fuel tank may be immediately vented to enable pressure relief and to maintain the integrity of the fuel tank.

In one example, a fuel system comprises an engine receiving fuel from a fuel tank, a canister for storing fuel tank fuel vapors, a canister vent valve (CVV) in a vent line coupling the canister to atmosphere, a canister purge valve (CPV) in a purge line coupling the canister to the engine, a vehicle motion sensor, a fuel level sensor coupled to the fuel tank for estimating a fill level of the tank and a temperature sensor coupled to the fuel tank for estimating a temperature of the tank. The controller with computer readable instructions stored on non-transitory memory may be configured for pulling down fuel tank pressure to a threshold pressure by opening the CPV and applying engine vacuum to the fuel tank and after vacuum pull-down, sealing the fuel system. In response to a higher than threshold rise in fuel tank pressure while each of a temperature and fill level of the fuel tank remain within a range, the controller may unseal the fuel system and abort a fuel system leak test. The controller may be further configured with instructions for indicating fuel tank oil-canning in response to the higher than threshold rise in fuel tank pressure while one or more of the temperature and fill level of the fuel tank remain within the range. The controller may be further configured for indicating no fuel tank oil-canning and unsealing the fuel system and aborting the fuel system leak test in response to the higher than threshold rise in fuel tank pressure while one or more of the temperature and fill level of the fuel tank fall outside the range. The controller may be further configured with instructions for indicating a fuel system leak based on a rate of vacuum decay being higher than a threshold rate in response to a lower than threshold rise in fuel tank pressure while maintaining the fuel system sealed. Sealing the fuel system includes closing one or more of a canister vent valve coupled between the fuel system canister and atmosphere, and a fuel tank isolation valve coupled between the fuel system canister and the fuel tank, and unsealing the fuel system includes opening the canister vent valve and the fuel tank isolation valve.

In a further representation, the method comprises during a purging condition, estimating a fuel tank vacuum pull-down rate based on a canister purge rate and while each of a fuel temperature and fill level remain within a range, indicating fuel tank oil canning based on an actual fuel tank vacuum pull-down rate relative to the estimated vacuum pull-down rate. Herein, indicating fuel tank oil-canning may be based on the actual fuel tank vacuum pull-down rate being higher than the estimated rate by more than a threshold amount. The method further includes, during the purging condition, opening a canister purge valve coupling a fuel system canister to an engine intake, a degree of opening based on the canister purge rate, and indicating fuel tank oil-canning due to a leak in the canister purge valve. Also during the purging condition, a canister vent valve flowing air from atmosphere to the canister via a vent line may be opened. The method may further include indicating a restriction in the vent line based on the actual rate being higher than the estimated rate by less than a threshold amount. In response to an indication of oil tank canning, the canister purge valve may be closed, while opening the canister vent valve, and discontinuing purging. In response to no indication of restriction in the vent line, the method may include closing the canister purge valve and discontinuing purging. In response to no indication of oil canning and no indication of restriction, the method may include maintaining the canister purge valve open and maintaining the purging.

In this way, by ruling out alternate factors that affect fuel tank pressure, a sudden pressure rise may be correlated with an oil-canning event, and appropriate mitigating steps may be taken in a timely fashion. In response to fuel tank oil-canning, the application of vacuum may be discontinued by closing the canister purge valve and the fuel tank may be vented to the atmosphere by opening the canister vent valve thereby protecting the fuel tank. Thus the accuracy of detection of oil-canning may be improved and appropriate mitigating steps may be taken to reduce the unintended degradation of the fuel tank and one or more sensors and actuators coupled to it. Overall, fuel system integrity can be better maintained.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:

determining a fuel tank pressure based on a fuel system sensor;

indicating fuel tank oil-canning responsive to a higher than a threshold rise in the fuel tank pressure following application of vacuum to a fuel tank while each of a fuel temperature and a fill level remains unchanged; and responsive to the fuel tank oil-canning, discontinuing the application of vacuum and venting the fuel tank to atmosphere.

2. The method of claim 1, further comprising, in response to the higher than the threshold rise in the fuel tank pressure occurring while one or more of the fuel temperature and the fill level changes, indicating no fuel tank oil-canning has occurred and maintaining the fuel tank sealed.

3. The method of claim 1, further comprising indicating fuel tank oil-canning responsive to higher than the threshold rise in the fuel tank pressure occurring during purging of fuel vapors from a fuel system canister to an engine intake manifold using an engine intake vacuum.

4. The method of claim 3, wherein the purging of fuel vapors includes opening a canister purge valve coupled between the fuel system canister and the engine intake manifold, and wherein the threshold rise is based on a degree of opening of the canister purge valve.

5. The method of claim 1, further comprising performing a leak detection routine and wherein application of the vacuum includes applying an engine intake vacuum to the fuel tank while performing the leak detection routine until a target fuel tank vacuum is reached.

6. The method of claim 5, wherein the threshold rise is based on the target fuel tank vacuum.

7. The method of claim 1, further comprising, estimating the fuel temperature based on output from a temperature sensor coupled to the fuel tank.

8. The method of claim 1, further comprising, determining the fill level based on an estimation of fuel slosh, the estimation of fuel slosh based on output from one or more of a fill level sensor and a vehicle motion sensor.

9. The method of claim 1, wherein the indicating includes setting a diagnostic code.

10. A method, comprising:

sealing a fuel tank after pulling down fuel tank pressure to a threshold vacuum; and responsive to each of a fuel temperature and a fill level remaining unchanged while the fuel tank pressure decreases below the threshold vacuum and subsequently rises at a threshold rate after the sealing, inferring fuel tank oil-canning and unsealing the fuel tank.

11. The method of claim 10, further comprising, responsive to inferring fuel tank oil-canning, setting a diagnostic code.

12. The method of claim 10, further comprising performing a fuel system leak detection and wherein the sealing the fuel tank is responsive to fuel system leak detection conditions being met, and wherein unsealing the fuel tank includes discontinuing the fuel system leak detection.

13. The method of claim 10, wherein the fuel tank is coupled to a fuel system canister, and wherein sealing the fuel tank includes closing one or more of a canister vent valve coupled between the fuel system canister and atmosphere, and a fuel tank isolation valve coupled between the fuel system canister and the fuel tank, and wherein unsealing the fuel tank includes opening the canister vent valve and the fuel tank isolation valve.

14. The method of claim 10, further comprising, responsive to the fuel tank pressure decreasing below the threshold vacuum and subsequently rising at the threshold rate after the sealing not occurring, maintaining the fuel tank sealed and estimating a fuel system leak based on a rate of vacuum decay.

15. A fuel system, comprising:

an engine receiving fuel from a fuel tank;

a canister for storing fuel tank fuel vapors;

a canister vent valve (CVV) in a vent line coupling the canister to atmosphere;

a canister purge valve (CPV) in a purge line coupling the canister to the engine;

a fuel level sensor coupled to the fuel tank for estimating a fill level of the fuel tank;

a temperature sensor coupled to the fuel tank for estimating a temperature of the fuel tank; and a controller with computer readable instructions stored on non-transitory memory for:

performing a fuel system leak test and pulling down fuel tank pressure to a threshold pressure by opening the CPV and applying engine vacuum to the fuel tank;

after vacuum pull-down, sealing the fuel system; and responsive to a higher than a threshold rise in fuel tank pressure while each of a temperature and fill level of the fuel tank remains unchanged, indicating fuel tank oil-canning; and responsive to the fuel tank oil-canning, setting a diagnostic code;

unsealing the fuel system and aborting the fuel system leak test.

16. The system of claim 15, wherein the controller includes further instructions for: responsive to the higher than the threshold rise in fuel tank pressure while one or more of the temperature and fill level of the fuel tank changes, indicating no fuel tank oil-canning, unsealing the fuel system, and aborting the fuel system leak test.

17. The system of claim 15, wherein the controller includes further instructions for: responsive to a lower than the threshold rise in fuel tank pressure, maintaining the fuel system sealed and indicating a fuel system leak based on a rate of vacuum decay being higher than a threshold rate.

18. The system of claim 15, wherein sealing the fuel system includes closing one or more of a canister vent valve coupled between the canister and atmosphere, and a fuel tank isolation valve coupled between the fuel system canister and the fuel tank, and wherein unsealing the fuel system responsive to the higher than the threshold rise in fuel tank pressure includes opening the canister vent valve and the fuel tank isolation valve to vent the fuel tank.

19. A method, comprising:

determining a fuel tank pressure based on a fuel system pressure sensor;

determining an estimation of fuel slosh based on output from one or more of a fill level sensor and a vehicle motion sensor;

estimating a fuel temperature based on a temperature sensor coupled to the fuel tank;

indicating fuel tank oil-canning responsive to a higher than a threshold rise in the fuel tank pressure following application of vacuum to a fuel tank while each of the fuel temperature and a fill level remains unchanged, the fill level determined based on the estimation of fuel slosh; and responsive to the fuel tank oil-canning, discontinuing the application of vacuum and venting the fuel tank to atmosphere.

20. A fuel system, comprising:

an engine receiving fuel from a fuel tank;

a canister for storing fuel tank fuel vapors;

a canister vent valve (CVV) in a vent line coupling the canister to atmosphere;

a canister purge valve (CPV) in a purge line coupling the canister to the engine;

a fuel level sensor coupled to the fuel tank for estimating a fill level of the fuel tank;

a temperature sensor coupled to the fuel tank for estimating a temperature of the fuel tank; and a controller with computer readable instructions stored on non-transitory memory for:

performing a fuel system leak test and pulling down fuel tank pressure to a threshold pressure by opening the CPV and applying engine vacuum to the fuel tank;

after vacuum pull-down, sealing the fuel system; and responsive to a higher than a threshold rise in fuel tank pressure while each of a temperature and fill level of the fuel tank remains unchanged, indicating fuel tank oil-canning;

setting a diagnostic code;

unsealing the fuel system and aborting the fuel system leak test; and responsive to the higher than the threshold rise in fuel tank pressure while one or more of the temperature and fill level of the fuel tank changes, indicating no fuel tank oil-canning, unsealing the fuel system, and aborting the fuel system leak test.

* * * * *